United States Patent
Sasaki et al.

(10) Patent No.: US 6,935,691 B1
(45) Date of Patent: Aug. 30, 2005

(54) VEHICLE SEAT WITH SEAT CUSHION TIP-UP STRUCTURE

(75) Inventors: Katsuhiko Sasaki, Tokyo (JP); Takao Tsutsui, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/822,680

(22) Filed: Apr. 13, 2004

(51) Int. Cl.[7] .............................................. B60N 2/02
(52) U.S. Cl. ................ 297/344.1; 297/331; 296/65.13; 248/421; 248/430
(58) Field of Search ......................... 297/344.1, 463.1; 248/430, 421, 429; 296/65.13, 65.14

(56) References Cited

U.S. PATENT DOCUMENTS

| | | | | |
|---|---|---|---|---|
| 2,951,527 | A | * | 9/1960 | Wassilieff ................ 297/344.1 |
| 4,707,030 | A | * | 11/1987 | Harding ...................... 297/341 |
| 4,856,847 | A | * | 8/1989 | Kanai .......................... 297/341 |
| 4,881,774 | A | * | 11/1989 | Bradley et al. ............. 297/341 |
| 5,100,092 | A | * | 3/1992 | Sovis .......................... 248/429 |
| 5,425,522 | A | * | 6/1995 | Retzlaff ....................... 248/429 |
| 5,785,292 | A | * | 7/1998 | Muraishi et al. ............ 248/429 |
| 5,820,216 | A | * | 10/1998 | Feuillet ....................... 297/341 |
| 6,231,123 | B1 | * | 5/2001 | Tame ....................... 297/378.1 |

FOREIGN PATENT DOCUMENTS

| | | | | | |
|---|---|---|---|---|---|
| JP | 52031424 | A | * | 3/1977 | ............ B60N 1/04 |
| JP | 60080935 | A | * | 5/1985 | ............ B60N 1/08 |
| JP | 2003-040009 | | | 2/2003 | |

* cited by examiner

*Primary Examiner*—Peter M. Cuomo
*Assistant Examiner*—Stephen D'Adamo
(74) *Attorney, Agent, or Firm*—Browdy and Neimark, P.L.L.C.

(57) ABSTRACT

Vehicle seat with seat cushion tip-up structure and lock mechanism for slide rail comprising upper and lower rails, wherein the upper rail fixed to the seat is locked and unlocked to the lower rail through the lock mechanism. An unlocking lever provided to the seat cushion is operatively connected via a first connecting link with a first arm element, wherein the first connecting link and first arm element are disposed at the seat cushion. The first arm element is connected with a second arm element disposed outwardly of the seat cushion, the second arm element being operatively connected via a second connecting link with the lock mechanism, wherein the second connecting link is disposed outwardly of the seat cushion. Operating the unlocking lever actuates the lock mechanism to unlock and lock the seat from and to the lower rail, irrespective of whether the seat cushion is tipped up or not.

6 Claims, 4 Drawing Sheets

VEHICLE SEAT WITH SEAT CUSHION TIP-UP STRUCTURE

BACKGROUND OF THE INVENTION

1. Field of the Invention

The present invention relates to a vehicle seat of the type having a tip-up structure (or mechanism) for allowing a seat cushion thereof to be tipped up to a generally upright non-use position, and in particular, the invention is directed to the vehicle seat with such seat cushion tip-up structure having an interlocked relation with a lock mechanism for locking and unlocking the seat to a given position in the fore-and-aft direction.

2. Description of Prior Art

There has been known a vehicle seat having a seat cushion tip-up structure by which a seat occupant can tip up the seat cushion thereof from a generally horizontal use position to a generally upright non-use position. For example, as disclosed from the Japanese Laid-Open Patent Publication No. 2003-40009, the seat disclosed therein is provided with a slide rail device to which a seat lock mechanism is operatively connected, and a seat cushion tip-up mechanism, wherein the slide rail device is formed by a lower rail and an upper rail slidably fitted in the lower rail. In this prior art, a base frame is connected with the upper rail, and a seat cushion is rotatably provided in the base frame to constitute the seat cushion tip-up structure allowing the seat cushion to be tipped up. Also, a rotary actuator piece is rotatably provided for causing locking and unlocking action of the seat lock mechanism, and a wire cable is connected between a control lever of the seat cushion tip-up mechanism and such rotary actuator piece, so that operating the control lever causes rotation of the rotary actuator piece to actuate the seat lock mechanism to lock and unlock the upper rail to and from the lower rail.

In this conventional type of seat, of course, the operation of the control lever is effected in both of the case where the seat cushion is in a horizontal normal use position and the case where it is in the tipped-up non-use position. Such seat cushion has a center of rotation at the backward end portion thereof and is provided with the foregoing control lever. Therefore, since the rotary actuator piece is disposed at the base frame or the upper rail, it has been found in some cases that the control lever interferes with the base frame, and that the wire or wiring between the control lever and the rotary piece interferes with the seat cushion tip-up mechanism, the seat cushion frame, or the base frame. For that reason, the conventional seats of this sort have been faced with some mechanical troubles and malfunction, and it is annoyingly necessary to arrange a rather intricate wiring in the seat cushion, which results in being an obstacle to smooth assembly of the vehicle seat with seat cushion tip-up mechanism.

SUMMARY OF THE INVENTION

In view of the above-stated drawbacks, it is therefore a purpose of the present invention to provide an improved vehicle seat with a seat cushion tip-up structure, which is simplified in structure and easy to operate, without requiring any wire element stated above.

In order to accomplish such purpose, in accordance with the present invention, there is provided the vehicle seat comprising:

a slide rail means comprising a lower rail means and an upper rail means slidably engaged with the lower rail means, allowing the upper rail means to be slidingly movable along the lower rail means in a forward direction forwardly of the vehicle seat and a backward direction backwardly of the vehicle seat;

a base frame means fixedly connected with the upper rail means;

a seat cushion rotatably connected with the base frame means so as to be able to be tipped up from a generally horizontal use position to an upright non-use position, the seat cushion having a forward end portion facing to the forward direction;

a lock mechanism for locking and unlocking the upper rail means to and from the lower rail means, the lock mechanism comprising: a lock means provided in the upper rail so as to be movable in one of a locking direction to lock the upper rail to the lower rail means and an unlocking direction to unlock the upper rail from the lower rail; and a rotary actuator means which is rotatably disposed above the lower rail means and operatively connected with the lock means; and a lock/unlock actuator mechanism for actuating the lock mechanism to cause locking and unlocking of the upper rail means to and from the lower rail means, the lock/unlock actuator mechanism being provided between the seat cushion and the lock mechanism, and comprising:

an unlocking lever movably provided under the forward end portion of the seat cushion, the operation lever being normally set at a locking position and operable therefrom to an unlocking position;

a first connecting link extending along a longitudinal direction of the seat cushion and being movable along the longitudinal direction, the first connecting link being at one end thereof operatively connected with the operation lever;

a first rotary arm rotatably provided between the seat cushion and the base frame means, the first rotary arm being at one end thereof operatively connected with another end of the first connecting link;

a second rotary arm fixedly connected at one end thereof with another end of the first rotary arm; and a second connecting link operatively connected between another end of the second rotary arm and the rotary actuator means of the lock mechanism, wherein, when the unlocking lever is set at the locking position, the lock means is retained in the locking direction so that the upper rail is locked to the lower rail, and wherein operation of the unlocking lever to the unlocking position causes movements of the first connecting link, the first rotary arm, the second rotary arm and the second connecting link, so as to rotate the rotary actuator means to move the lock means in the unlocking direction, so that the upper rail is unlocked from the lower rail.

Other various features and advantages of the present invention will become apparent from reading of the description hereinafter, with reference to the annexed drawings.

DETAILED DESCRIPTION OF PREFERRED EMBODIMENT OF THE INVENTION

Referring to FIGS. 1 to 5, there is illustrated a preferred embodiment of a vehicle seat with a seat cushion tip-up structure in accordance with the present invention.

Figure 1:
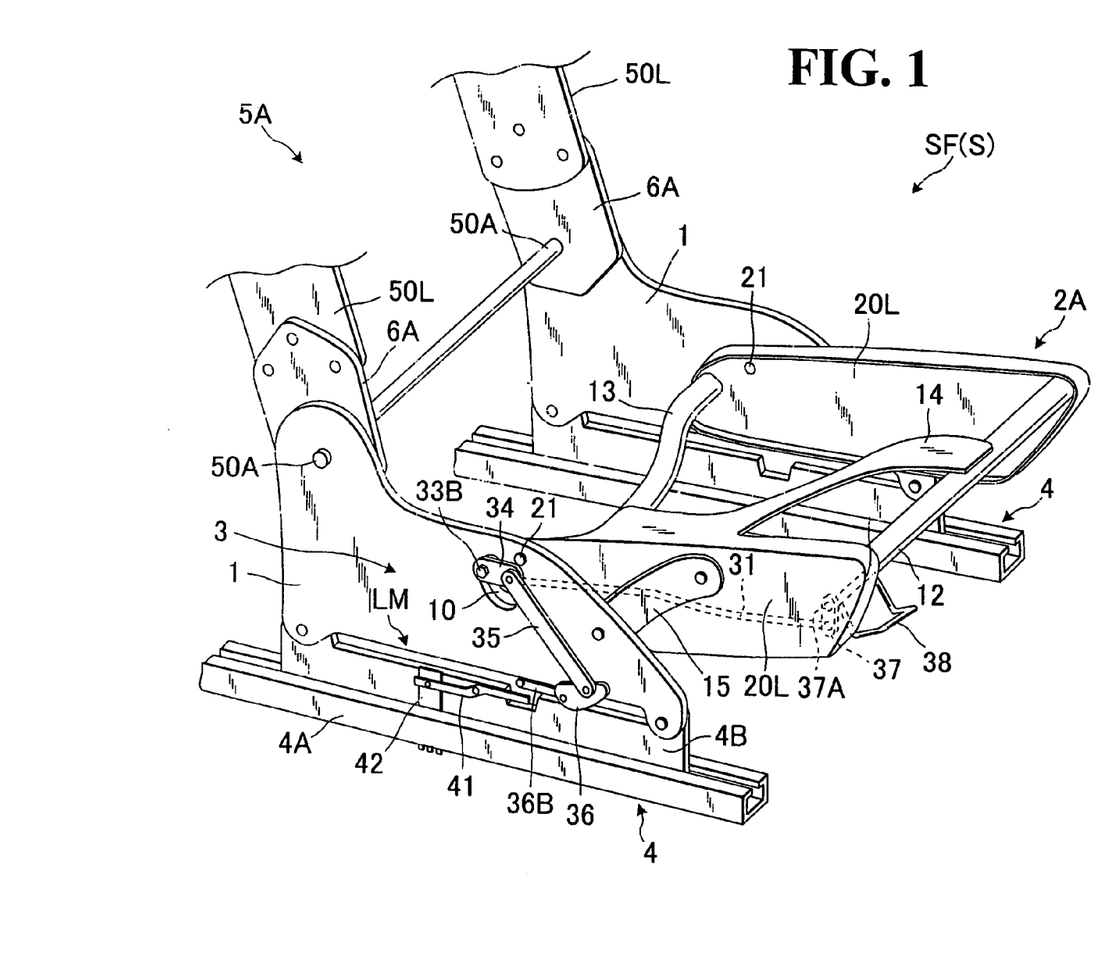
FIG. 1 is a partly broken schematic perspective view showing a framework of a vehicle seat with seat cushion tip-up structure in accordance with the present invention.
Figure 2:
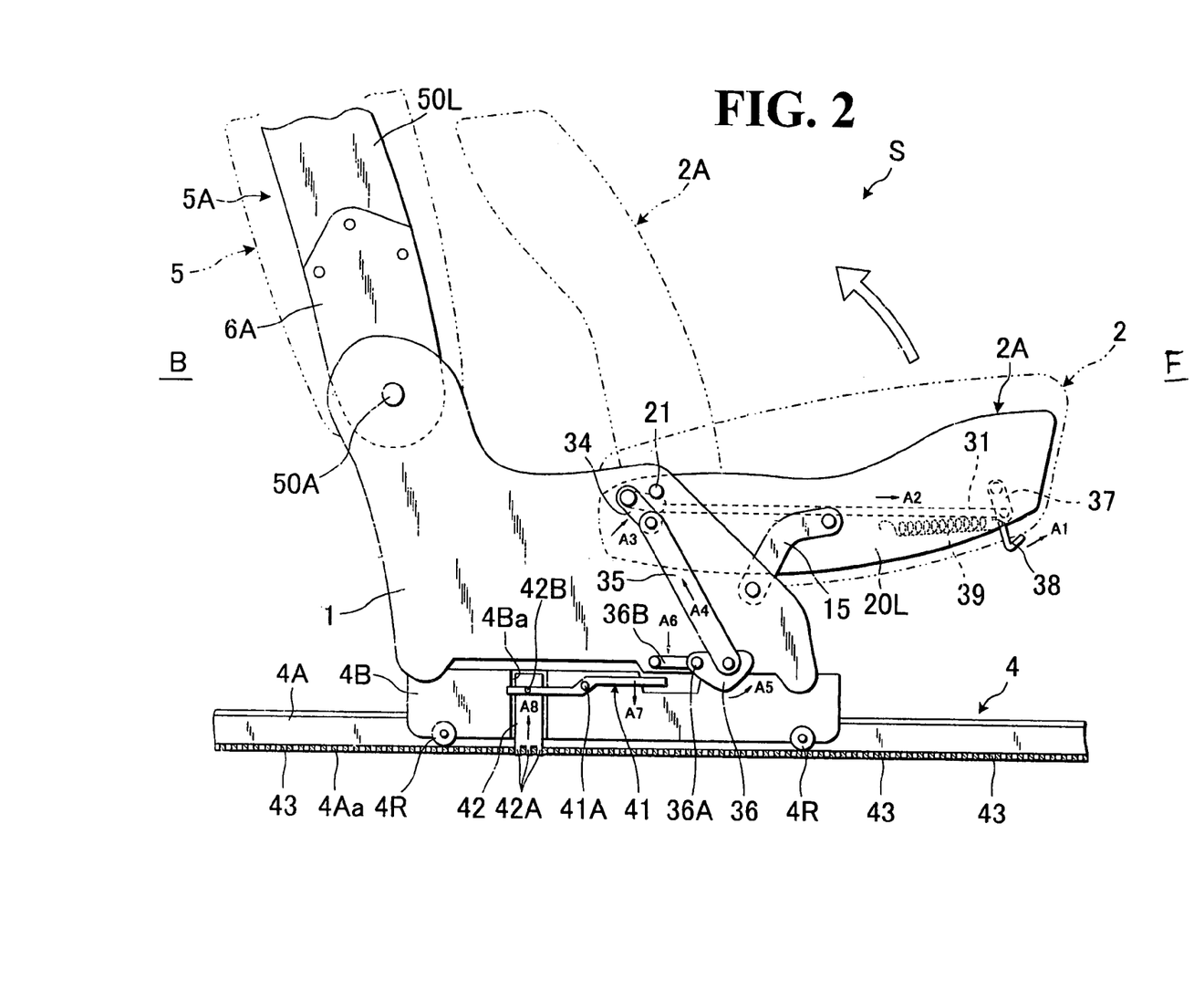
FIG. 2 is a partly broken elevational view of the seat vehicle seat, which explanatorily shows the state where the seat cushion is unlocked and tipped up.

As seen from FIGS. 1 and 2, the illustrative vehicle seat of this kind, generally designated by (S), is typically formed by a base frame member (1), a seat back (5) pivotally connected with a backward portion of the base frame member (1), and a seat cushion (2) pivotally connected with a forward portion of the base frame member (1) via an auxiliary guide link member (15), such that the seat cushion (2) may be rotated between a generally horizontal use position and a generally upright non-use position as understandable from FIG. 2. Namely, the seat cushion (2) can be tipped up via a suitable tip-up mechanism for automotive seat (not shown) to the upright non-use position, substantially in parallel with the vertically extending seat back (5), wherein the not-shown tip-up mechanism is well known in the art and any specific description thereon is omitted as it is not a subject matter of the present invention.

Further, a pair of known spaced-apart slide rails (4) (4) are provided for allowing the seat (S) to be movable in forward and backward directions. Each of the two slide rails (4) comprises a lower rail (4A) and an upper rail (4B) slidably engaged with the lower rail (4A), wherein the lower rail (4A) is adapted for fixation to a floor of vehicle (not shown).

In this context, it is noted that, hereinafter, the wording, "forward direction" or "forwardly", and the wording, "backward direction" or "backwardly", shall refer to a direction to the forward side (F) of seat (S) and a direction to a backward side (B) of seat (S), respectively.

As shown, a pair of the base frame members (1) (1) are fixedly connected with the two upper rails (4B), respectively.

The seat back (5) includes a seat back frame (5A) having a pair of lateral frame portions (50L) (50L). The two lateral frame portions (50L) (50L) are fixedly connected at their respective lower ends with a pair of upper arms (6A) associated with a reclining device (not shown). Designation (50A) denotes a connecting rod associated with the reclining device, which is operatively connected between the to upper arms (6A).

Figure 3:
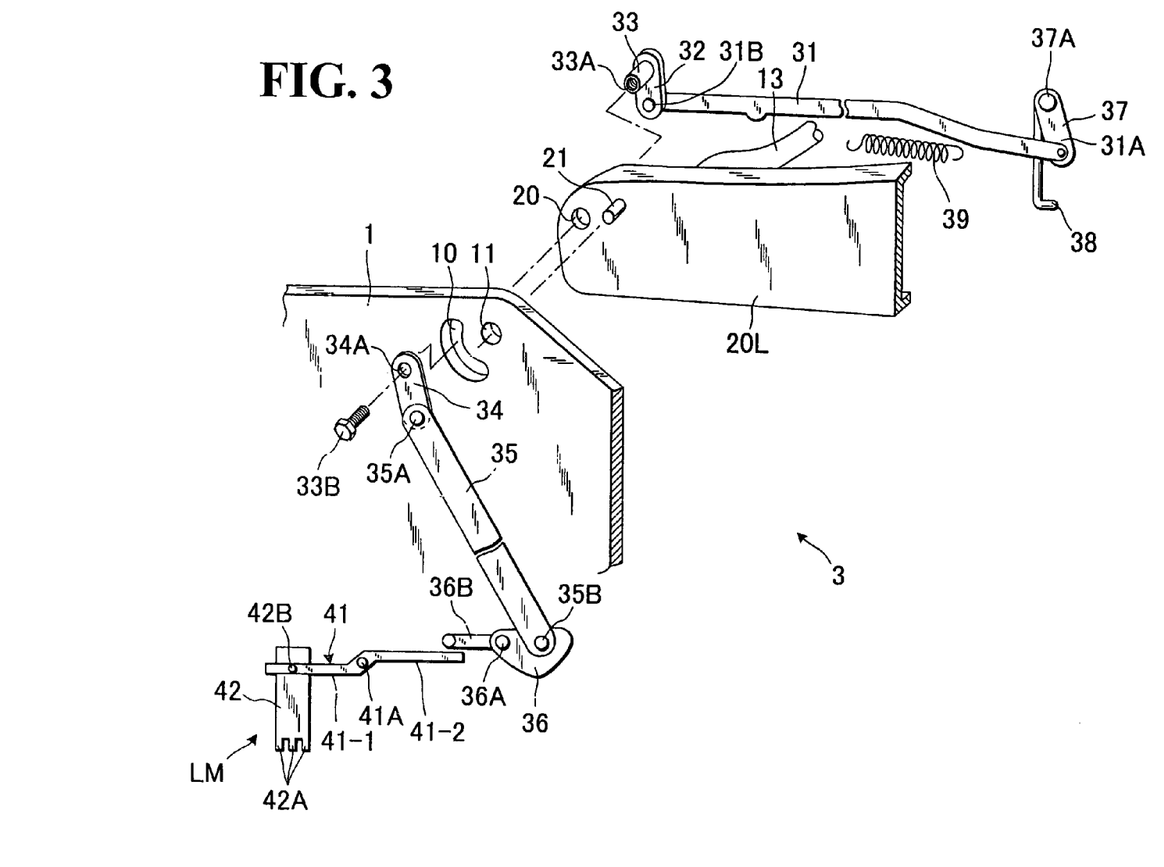
FIG. 3 is a partly broken exploded perspective view of principal parts of the present invention.

The seat cushion (2) includes a seat cushion frame (2A) which is formed by a pair of lateral frame members (20L) (20L), a forward tubular frame member (12), a backward tubular frame member (13), and a support frame portion (14). As best seen in FIG. 3 in conjunction with FIG. 1, each lateral frame member (20L) is formed with a pivot pin (21) at the backward end portion thereof, and such pivot pin (21) is rotatably inserted in a hole (11) formed in the forward upper end region of each base frame member (1), thereby allowing the seat cushion frame (20) to be rotatable about the pin (21), whereupon the seat cushion (2) may be tipped up from the horizontal use position at the base frame member (1) to the upright non-use position adjacent to the seat back (5).

It is noted that, as indicated by the one-dot chain lines in FIG. 2, the seat back frame (5A) and seat cushion frame (2A) are properly upholstered to constitute the seat back (5) and seat cushion (2), respectively.

In one of the two slide rails (4), is provided a known latch-type lock mechanism (LM) for locking and unlocking the upper rails (4B) to and from the lower rails (4A), the lock mechanism (LM) comprising a latch plate (42) having three lock pieces (42A) and a plurality of lock holes (43) formed in the bottom wall (4Aa) of the lower rail (4A). The latch plate (42) is slidably fit in the vertically cut-away area (4Ba) of the upper rail (4B) so as to be vertically movable for engagement into and disengagement from the corresponding three of the lock holes (43), so that the seat (S) may be unlocked for forward and backward movement along the lower rail (4A), or locked to a desired point on the lower rail (4A).

In accordance with the present invention, there is provided a locking/unlocking actuation mechanism (3) between the seat cushion (2) and the foregoing lock mechanism (LM), by means of which, a user, when tipping up the seat cushion (2), can cause the lock mechanism (LM) to actuate for releasing a locked state the seat (S) to a side of floor.

The locking/unlocking actuation mechanism (3) is basically comprised of: an unlocking lever (38); a first rotary arm (32); a first connecting link (31); a second rotary arm (34); a second connecting link (35); a rotary actuator piece (36); and a tilting actuator member (41).

More specifically, the unlocking lever (38) is rotatably provided under the forward end portion of the seat cushion (2). Namely, the unlocking lever (38) is fixed to a support shaft (37A) rotatably connected with the forward tubular frame (12) of the seat cushion frame (2A) so as to be rotatable between an inoperative locking position shown in FIG. 2 and an unlocking position shown in FIG. 4. A pulling spring (39) is connected between the unlocking lever (38) and a securing member (not shown) fixed to the inward side of the lateral frame portion (20L) of seat cushion frame (2A), so that the unlocking lever (38) is normally biased by the spring (38) to the locking position.

Designations (37) denotes a link piece which is disposed forwardly of the seat cushion frame (2A) and fixed at its upper end to the foregoing support shaft (37A) adjacent to the unlocking lever (38).

The first rotary arm (32) is disposed backwardly of the seat cushion frame (2A) and has a connecting shaft (33) formed in the upper end thereof, the connecting shaft (33) having a threaded hole (33A) defined therein.

The first connecting link (31) is movably connected between those link piece (37) and first rotary arm (32) in such a manner that the forward end thereof is pivotally connected by a pin (31A) with the lower end of the link piece (37), while the backward end thereof is pivotally connected by a pin (31B) with the lower end of the first rotary arm (32).

As best seen in FIG. 3, the connecting shaft (33) of the first rotary arm (32) is rotatably inserted in a hole (20) formed in the backward end region of the lateral frame portion (20L) at a point adjacent to the shaft (21) which projects horizontally from that particular backward end region of lateral frame portion (20L).

Figure 5:
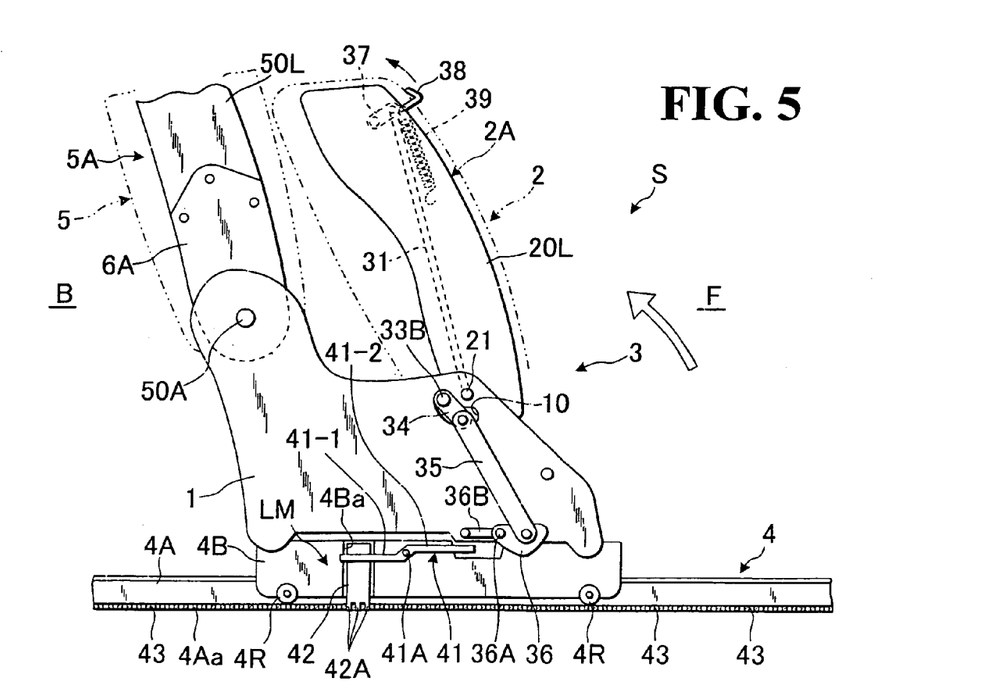
FIG. 5 is a partly broken elevational view showing the state where the seat cushion has been tipped to a generally non-use position.

As also best seen in FIG. 3, an arcuate guide hole (10) and a bearing hole (11) are formed in the upper end region of the base frame member (1), such that the former hole (10) is defined along the circumference of a circle having a center at the latter hole (11). The shaft (21) is rotatably inserted in the bearing hole (11) of the base frame member (1) as stated above, thereby allowing the seat cushion frame (2A) to be rotatable vertically to and away from the base frame member (1), so that the seat cushion (2) can be tipped up to an upright non-use position as shown in FIG. 5. On the other hand, the connecting shaft (33) of first rotary arm (32) is slidably inserted through the arcuate guide hole (10). Thus, it is seen that the connecting shaft (33) is slidingly moved along the arcuate guide hole (10) with rotation of the seat cushion frame (2A) about the shaft (21).

The connecting shaft (33), inserted through the arcuate guide hole (10) as stated above, is fixedly coupled with the upper end of the second rotary arm (34). This is done by inserting a securing screw (33B) through a hole (34A) formed in that upper end of second rotary arm (34) and threadedly engaged in the threaded hole (33A) of the connecting shaft (33) as indicated in FIG. 3. Pivotally connected with the lower end of such second rotary arm (34) is one end of the second connecting link (35) by means of a pin (35A). Another end of this second connecting link (35) is pivotally connected with one end region of the rotary actuator piece (36) that faces to a direction forwardly of the seat (S).

The rotary actuator piece (36) has a pressure rod (36B) extending backwardly toward the lock mechanism (LM) and is rotatably connected at a forward end thereof with the lower end portion of the base frame member (1) by a pin (36A) so as to be rotatable about the pin (36A). The backward end of the rotary actuator piece (36) is pivotally connected with the lower end of the second connecting link (35), so that the second connecting link (35) is pivotally connected between the second rotary arm (34) and the rotary actuator piece (36).

In this context, it is seen in FIG. 2 that, when the seat (S) is in the normal use as shown by the solid lines, with the unlocking lever (38) in the locking position, the lock/unlock actuation mechanism (3) or all its constituent parts (31, 32, 33, 34, 36, 37 and so forth) are thus in an inoperative state with respect to the lock mechanism (LM), under which state, the rotary actuator piece (36) is retained in the illustrative inoperative state where the pressure rod (36B) extends backwardly and horizontally along a rectilinear line.

The tilting actuator member (41) is rotatably attached at the center thereof to the upper end region of the upper rail (4B) by a pin (41A) and extends horizontally in parallel therewith, in such a manner that one half portion (41-1) thereof extends backwardly across the latch plate (42), while being pivotally connected by a pin (42B) with the latch plate (42), and that another half portion (41-2) thereof extends forwardly at a level below the pressure rod (36B) in parallel therewith.

Now, description will be made of operation of the above-constructed seat (S), with particular reference to FIGS. 2, 4 and 5.

At first, as understandable from FIG. 2 in conjunction with FIG. 3, the unlocking lever (38) is rotated forwardly or anticlockwise to an unlocking position, as indicated by the arrow (A1), against the biasing force of the spring (39), which in turn causes simultaneous anticlockwise rotation of the link piece (37), thereby displacing the first connecting link (31) in the forward direction (A2). Simultaneous therewith, the first rotary arm (32) is also rotated anticlockwise to cause likewise rotation of the connecting shaft (33), thereby causing anticlockwise rotation of the second rotary arm (34) about that shaft (33) as indicated by the arrow (A3). With such rotation of second rotary arm (34), the second connecting link (35) is displaced upwardly as indicated by the arrow (A4), thereby causing anticlockwise rotation of the rotary actuator piece (36) about the pin (36A) as indicated by the arrow (A5), with the pressure rod (36B) being contacted with the foregoing another half portion (41-2) of tilting actuator member (41) and rotated downwardly to push it, as indicated by the arrow (A6). As a result thereof, the tilting actuator member (41) is rotated about the pin (41A) clockwise as indicated by the arrow (A7), thereby causing upward movement of the latch plate (42) to an unlocking position to disengage its three lock pieces (42A) from the corresponding three of the lock holes (43). Those series of unlocking operations are also shown in FIG. 4 from which it is observed that all the arrows ① indicate the unlocking operation of the unlocking lever (38), the simultaneous unlocking movements of the rotary actuator piece (36), pressure rod (36B) and tilting actuator member (41), and the resultant upward disengagement of the latch plate (42) from the lower rail (4A). As a result thereof, the upper rail (4B) is released from the state locked to the lower rail (4A), thus allowing the seat (S) to be movable in the forward and backward directions as indicated by the arrows in FIG. 4.

Figure 4:
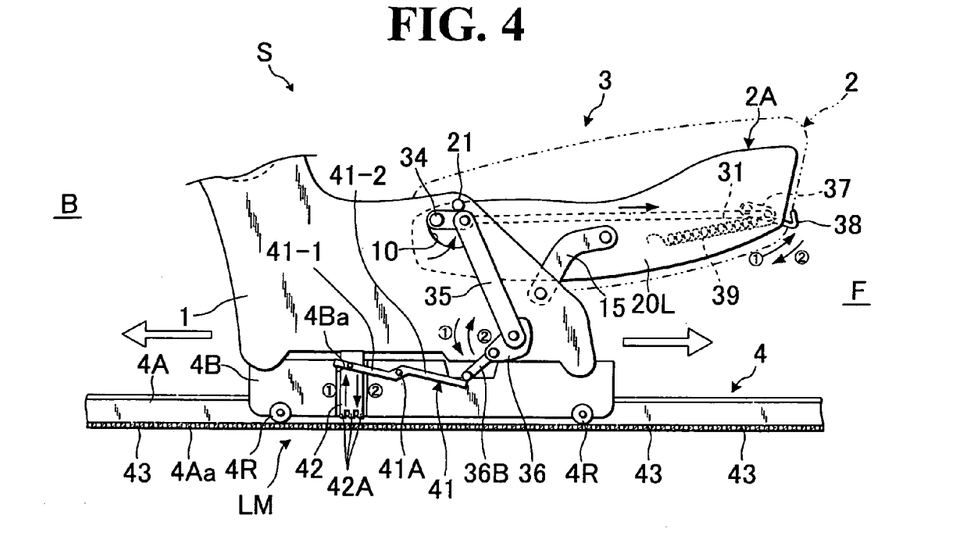
FIG. 4 is a partly broken elevational view which explanatorily shows the unlocking actions of the principal parts for unlocking and tipping up the normally positioned seat cushion.

Accordingly, a user can move the seat (S) to a desired point by retaining the unlocking lever (38) in the unlocking position as shown in FIG. 4, with his or her hand, against the biasing force of the spring (39), and then, can release the unlocking lever (38) to the inoperative locking position, as indicated by the arrow ② in FIG. 2, so that the rotary actuator piece (36) is rotated clockwise as indicated by the arrow ②, thereby causing the three lock pieces (42A) of latch plate (42) to engage in the respective selected three lock holes (43) through the tilting actuator member (41), and therefore, the seat (S) is locked in the desired point on the lower rail (4A). It is noted here that the latch plate (42) is positively retained in such locked state to the lower rail (4A) under the biasing force of spring (39).

Thereafter, the user can tip up the seat cushion (2) to the upright non-use position as shown in FIG. 5. At this point, it is to be seen that, with the upward rotation or tipping up of the seat cushion (2), the connecting shaft (33) is slidingly rotated in and along the arcuate guide hole (10) anticlockwise relative to the shaft (21) from a home position where the connecting shaft (33) is contacted with the upper extremity or edge of the arcuate guide hole (10) when the seat cushion (2) is set in the generally horizontal use position. That is, when the seat cushion (2) is tipped up, the connecting shaft (33) is displaced from the upper edge to the lower edge of the arcuate guide hole (10). This gives a play to the rotation of connecting shaft (33) about the shaft (21) so as to prevent interference of the connecting shaft (33) with the tipping up of the seat cushion (2), and, more than that, it should be noted that the connecting shaft (33) is indeed about to be moved in the downward direction along the arcuate hole (10) as if it tended to move the second connecting link (35), rotary actuator piece (36) and tilting actuator member (41) to disengage the latch plate (42) from the lock holes (43), but, the biasing or pulling force of the spring (39) acts to quickly draw the connecting shaft (33) back to the home position where it is contacted with the upper edge of arcuate hole (10), thereby preventing disengagement of the latch plate (42) from the lock holes (43). Thus, the tipping up of the seat cushion (2) does not result in unlocking the seat (S) from the lower rail (4A). FIG. 5 shows the state where the seat cushion (2) has been tipped up to the upright non-use position, while the seat (S) is locked to the lower rail (4), from which it can be seen that the securing screw (33B) is located at the upper edge of the arcuate hole (10), which indicates the fact that the connecting shaft (33) is contacted with that upper edge of arcuate hole (10) under the biasing force of spring (39), thereby retaining the rotary actuator piece (36) as well as the pressure rod (36B) in the horizontal inoperative position giving no unlocking action to the latch plate (42).

As can be seen from FIG. 5, in the tipped-up state of seat cushion (2), all the second rotary arm (34), second connecting link (35), rotary actuator piece (36) and tilting actuator member (41) are in an inoperative state to the latch plate (42), which is in the same state as in the normal seating state of seat (S) shown in FIG. 2. Therefore, in such tipped-up state, the unlocking lever (38) may be operated to unlock the latch plate (42) from the lower rail (4A). Since this unlocking operation is substantially the same as the unlocking operation specified above for the case of the normal seating state as in FIG. 2, a brief description will be made of the operation with reference to FIG. 5. Namely, as indicated by the arrow in the FIG. 5, the unlocking lever (38) can be rotated anticlockwise to the unlocking position against the biasing force of the spring (39), which in turn causes upward displacement of the first connecting link (31) to rotate the second rotary arm (34) anticlockwise, and then, through the resultant movements of the second connecting link (35), rotary actuator piece (36) and tilting actuator member (41) in the same way as stated earlier, the latch plate (42) is raised to an unlocking position to disengage its three lock pieces (42A) from the corresponding three of the lock holes (43), likewise as in the direction of arrow ① in FIG. 4, so that the upper rail (4B) is released from the state locked to the lower rail (4A), thus allowing the seat (S) to be movable in the forward and backward directions. In this case also, a user can move the seat (S) to a desired point by retaining the unlocking lever (38) in the unlocking position with his or her hand against the biasing force of the spring (39), and then can release the unlocking lever (38) to the inoperative locking position so as to cause engagement of the latch plate three lock pieces (42A) in the respective selected three lock holes (43), thereby locking the seat (S) to a desired point on the lower rail (4A).

It is noted that, while not shown, if the user tips up the seat cushion (2) while retaining the unlocking lever (38) to the unlocking position, then the connecting shaft (33) is subjected to sliding movement along the arcuate hole (10) to the lower edge (10B) of that particular arcuate hole (10), which simultaneously causes further upward displacement of the second connecting link (35), thereby causing further anti-clockwise rotation of the rotary actuator piece (36) from the point shown in FIG. 4, so that the pressure rod (36B) is displaced out of contact with the backward half portion (41-2) of tilting actuator member (41), resulting in the tilting actuator member (41) being automatically rotated back to the horizontal inoperative position as in FIG. 2 due to the weight of the latch plate (42), whereupon the latch plate (42) is lowered for engagement in the lock holes (43). At that point, the pressure rod (36B) of rotary actuator piece (36) is slightly rotated by an angle near to (i.e. not contacted with) the afore-said another half portion (41-2) of tilting actuator member (41). Then, upon the user releasing the unlocking lever (38) from the unlocking position, there occurs automatic return of that particular unlocking lever (38) to the locking position under the pulling force of the spring (39), which in turn causes the connecting shaft (33) to quicky slide back to the upper edge of arcuate hole (10). Consequently, both second rotary arm (34) and second connecting link (35) are returned to their respective inoperative home positions shown in FIG. 2, with the result that the rotary actuator piece (36) is rotated accordingly by such an angle that brings the pressure rod (36B) to the normal horizontal inactive position above the said another half portion (41-2) of tilting actuator member (41), as shown in FIG. 2. Those not-shown series of actions will be easily understood by any person skill in the art who reads the descriptions given so far and the annexed drawings.

In any case, with the above-described arrangement, the pin (35A) or a point for connecting the second rotary arm (34) and the second connecting link (35) is retained substantially at a fixed point, which permits for locking and unlocking operation by the unlocking lever (38) in both of the following two cases: the seat cushion tipped-up case where the seat cushion (2) is tipped up to the upright use position, and the seat cushion use case where the seat cushion (2) is set in a generally horizontal use position.

Accordingly, in accordance with the present invention, it is appreciated that the seat (S) requires neither of wires and cables between the seat cushion and unlocking lever and therefore, the structure thereof is simplified and easy to assemble.

While having described the present invention, it should be understood that the invention is not limited to the illustrated embodiment, but other various modifications, replacements and additions may be applied thereto without departing from the scopes of the appended claims.

What is claimed is:

1. A vehicle seat with a seat cushion tip-up structure comprising:
   a slide rail means comprising a lower rail means and an upper rail means slidably engaged with said lower rail means, allowing said upper rail means to be slidingly movable along said lower rail means in a forward direction to a side forwardly of said vehicle seat and a backward direction to a side backwardly of said vehicle seat;
   a base frame means fixedly connected with said upper rail means;
   a seat cushion rotatably connected with said base frame means so as to be able to be tipped up from a generally horizontal use position to a generally upright non-use position, said seat cushion having a forward end portion facing to said forward direction;
   a lock mechanism for locking and unlocking said upper rail means to and from said lower rail means, said lock mechanism comprising: a lock means provided in said upper rail so as to be movable in one of a locking direction to lock said upper rail to said lower rail means and an unlocking direction to unlock said upper rail from said lower rail; and a rotary actuator means which is rotatably disposed above said lower rail means and operatively connected with said lock means; and
   a lock/unlock actuator mechanism for actuating said lock mechanism to cause locking and unlocking of said upper rail means to and from said lower rail means, said lock/unlock actuator mechanism being provided between said seat cushion and said lock mechanism, and comprising:
      an unlocking lever movably provided under said forward end portion of said seat cushion, said operation lever being normally set at a locking position and operable therefrom to an unlocking position;
      a first connecting link extending along a longitudinal direction of said seat cushion and being movable along said longitudinal direction, said first connecting link being at one end thereof operatively connected with said operation lever;

a first rotary arm rotatably provided between said seat cushion and said base frame means, said first rotary arm being at one end thereof operatively connected with another end of said first connecting link;

a second rotary arm fixedly connected at one end thereof with another end of said first rotary arm; and a second connecting link operatively connected between another end of said second rotary arm and said rotary actuator means of said lock mechanism;

wherein, when said unlocking lever is set at said locking position, said lock means is retained in said locking direction so that said upper rail is locked to said lower rail, and wherein operation of said unlocking lever to said unlocking position causes movements of said first connecting link, said first rotary arm, said second rotary arm and said second connecting link, so as to rotate said rotary actuator means to move said lock means in said unlocking direction, so that said upper rail is unlocked from said lower rail.

2. The vehicle seat as claimed in claim 1, wherein, said second connecting link has one end pivotally connected with said another end of said second rotary arm, wherein said rotary actuator means of said lock mechanism comprises:

a rotary actuator piece rotatably provided to one of said seat back and said upper rail, said rotary actuator piece having one end portion pivotally connected with said another end of said second connecting link, and another end; and a tilting actuator element rotatable about a center thereof, said tilting actuator element having one half portion and another half portion, wherein said one half portion of said tilting actuator element is pivotally connected with said lock means; and wherein, when said unlocking lever is set at said locking position, said another half portion of said tilting actuator element is normally disposed below said another end of said rotary actuator piece, while on the other hand, operation of said unlocking lever to said unlocking position causes rotation of said rotary actuator piece so as to bring said another end of the rotary actuator piece to contact with said another half portion of the tilting actuator element, so that, with further rotation of said rotary actuator piece, said tilting actuator element is rotated to cause rotation of said one half portion to move said lock means in said unlocking direction, whereby said upper rail is unlocked from said lower rail.

3. The vehicle seat according to claim 2, wherein a pressure rod is fixed to said another end of said rotary actuator piece, and wherein, when said unlocking lever is set at said locking position, said pressure rod is disposed above said another half portion of said tilting actuator element, while on the other hand, operation of said unlocking lever to said unlocking position causes rotation of said rotary actuator piece so as to bring said pressure rod to contact with said another half portion of the tilting actuator element, so that, with further rotation of said rotary actuator piece, said tilting actuator element is rotated to cause rotation of said one half portion to move said lock means in said unlocking direction, whereby said upper rail is unlocked from said lower rail.

4. A vehicle seat with a seat cushion tip-up structure comprising:

a slide rail means comprising a lower rail means and an upper rail means slidably engaged with said lower rail means, allowing said upper rail means to be slidingly movable along said lower rail means in a forward direction to a side forwardly of said vehicle seat and a backward direction to a side backwardly of said vehicle seat;

a base frame means fixedly connected with said upper rail means;

a seat cushion having a seat cushion frame provided therein, said seat cushion frame being rotatably connected with said base frame means so as to permit vertical rotation of the seat cushion frame between a generally horizontal use position and a generally upright non-use position, thereby allowing said seat cushion to be tipped up from said generally horizontal use position to said generally upright non-use position, wherein said seat cushion has a forward end portion facing to said forward direction;

said base frame means including: a point with which said seat cushion frame is rotatably connected; and an arcuate hole defined along a circumference of a circle having its center at said point;

a lock mechanism for locking and unlocking said upper rail means to and from said lower rail means, said lock mechanism comprising: a lock means provided in said upper rail so as to be movable in one of a locking direction to lock said upper rail to said lower rail means and an unlocking direction to unlock said upper rail from said lower rail; and a rotary actuator means which is rotatably disposed above said lower rail means and operatively connected with said lock means; and a lock/unlock actuator mechanism for actuating said lock mechanism to cause locking and unlocking of said upper rail means to and from said lower rail means, said lock/unlock actuator mechanism being provided between said seat cushion and said lock mechanism, and comprising:

an unlocking lever movably provided under said forward end portion of said seat cushion, said operation lever being normally set at a locking position and operable therefrom to an unlocking position;

a first connecting link extending along a longitudinal direction of said seat cushion and being movable along said longitudinal direction, said first connecting link being at one end thereof operatively connected with said unlocking lever;

a first rotary arm rotatably provided between said seat cushion and said base frame means, said first rotary arm being at one end thereof operatively connected with another end of said first connecting link;

a connecting shaft;

a second rotary arm fixedly connected at one end thereof with another end of said first rotary arm by said connecting shaft;

said connecting shaft being slidably inserted through said arcuate hole; and a second connecting link operatively connected between another end of said second rotary arm and said rotary actuator means of said lock mechanism;

wherein, when said unlocking lever is set at said locking position, said lock means is retained in said locking direction so that said upper rail is locked to said lower rail, and wherein operation of said unlocking lever to said unlocking position causes movement of said first connecting link to simultaneously rotate said first and second rotary arms, thereby causing movement of said second connecting link so as to rotate said rotary actuator means to move said lock means in said unlocking direction, so that said upper rail is unlocked from said lower rail, and wherein, when rotating said seat cushion vertically, said connecting shaft is slidingly moved along said arcuate hole, thereby avoiding interference of the connecting shaft with said base frame means.

5. The vehicle seat as claimed in claim 4, wherein said seat cushion is disposed inwardly of said base frame means, wherein said second connecting link and said second rotary arm are disposed outwardly of said base frame means, wherein said seat cushion frame has a hole formed therein, wherein both said first connecting link and said first rotary arm are disposed inwardly of said seat cushion frame, wherein said connecting shaft passes through said hole of said seat cushion frame as well as through said arcuate hole of said base frame means, thus connecting said first and second rotary arms in relation to said base frame means.

6. The vehicle seat as claimed in claim 4, wherein a biasing means is provided for resiliently biasing said unlocking lever to said locking position, and said arcuate hole has one edge and another edge, with such an arrangement that, when said seat cushion is set in said generally horizontal use position, a biasing force of said biasing means acts to resiliently retain said unlocking lever in said locking direction, with said connecting shaft in contact with said one edge of said arcuate hole, whereby said rotary actuator means is positively retained in said unlocking direction to thereby keep said upper rail locked to said lower rail, and that, when tipping up said seat cushion to said generally upright non-sue position, said connecting shaft is slightly moved along said arcuate hole in a direction from said one edge to said another edge of said particular arcuate hole, but drawn back to said one edge under the biasing force of said biasing means, so that, regardless of whether said seat cushion is in said generally horizontal use position or in said generally upright non-use position, both said lock mechanism and said lock/unlock actuation mechanism are retained in inoperative state, thereby normally retaining said vehicle seat in a state locked to a given position on said lower rail, while allowing said unlocking lever to be operable from said locking position to said unlocking position, or vice versus.

* * * * *